Feb. 19, 1924.
A. O. ABBOTT, JR
1,484,455
METHOD AND APPARATUS FOR MARKING TIRE FLAPS
Filed June 8, 1921    2 Sheets-Sheet 1
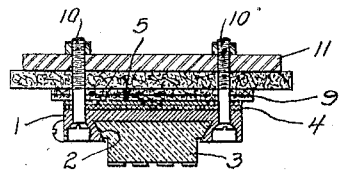
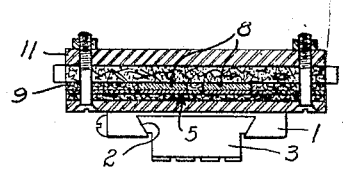
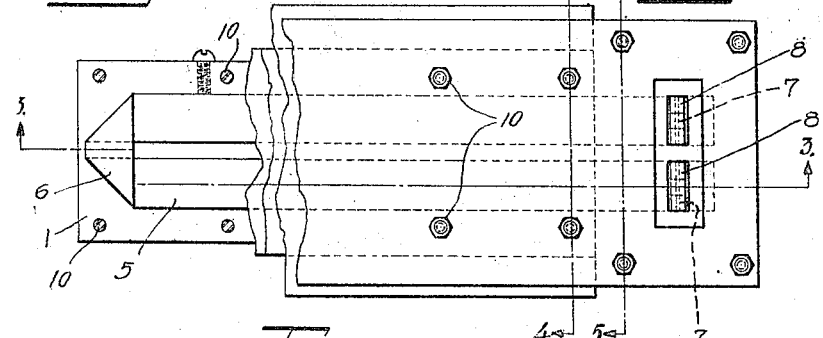
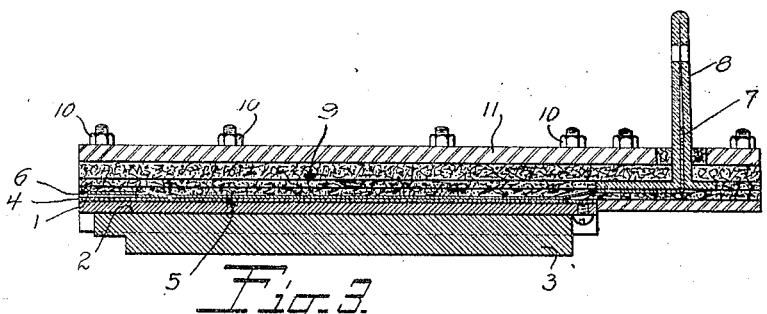
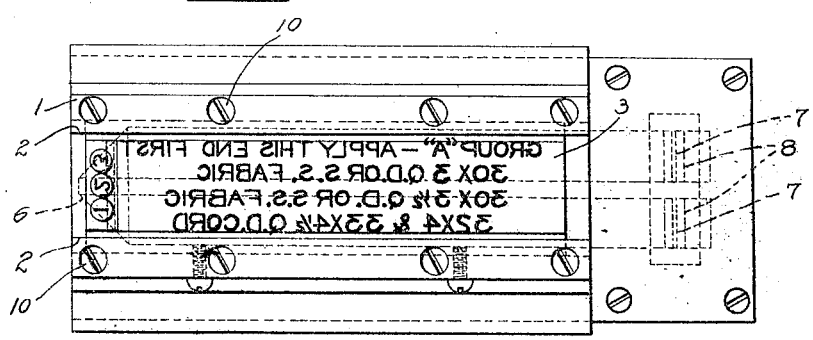
INVENTOR
ADRIAN O. ABBOTT, JR.
BY
Ernest Hopkinson
HIS ATTORNEY

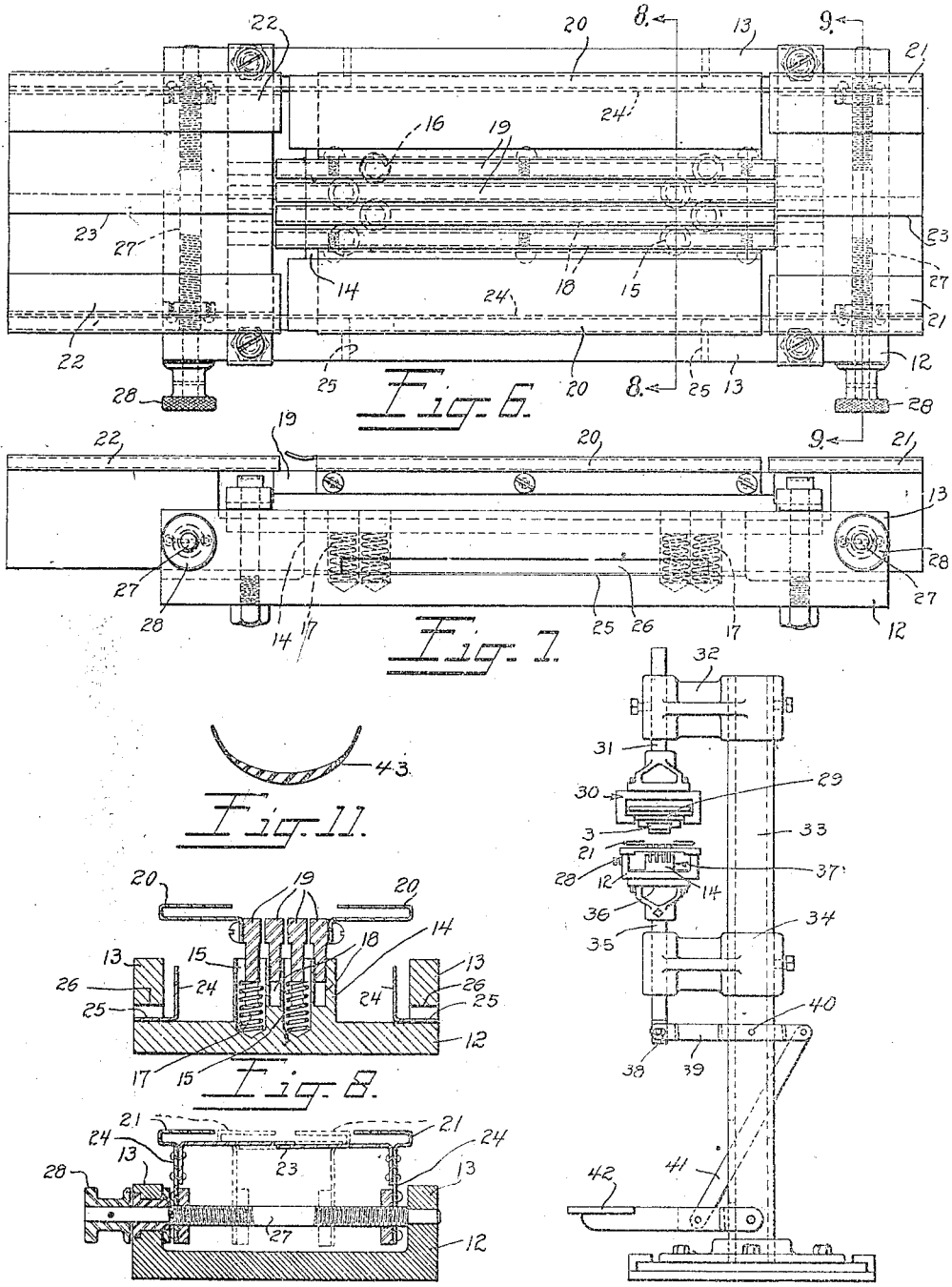

Patented Feb. 19, 1924.

1,484,455

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

METHOD AND APPARATUS FOR MARKING TIRE FLAPS.

Application filed June 8, 1921. Serial No. 475,953.

*To all whom it may concern:*

Be it known that I, ADRIAN O. ABBOTT, Jr., a citizen of the United States, residing at Detroit, county of Wayne, and State of Michigan, have invented certain new and useful Improvements in Methods and Apparatus for Marking Tire Flaps, of which the following is a full, clear, and exact description.

This invention relates to an apparatus for branding articles of rubberized fabric in general and in particular tire flaps.

It is desirable to indicate upon the various sizes of flaps, the particular size of tire for which they are intended inasmuch as if placed in the wrong tire, serious damage to the inner tube may result. Heretofore this data or information has been printed in ink, usually with hand stamps. The work has not been done in a uniform manner and the ink has been found to smear and render the lettering illegible in the necessary handling and piling up of the flaps. A high degree of humidity aggravates or increases the liability of smearing. The tire flaps are also often curved in cross section and more or less warped and difficulty has been encountered in stamping them uniformly in the same location and with the same intensity.

The present invention aims to provide a branding apparatus that will mark articles of rubberized fabric, or of rubber composition, with a uniform intensity, in the same relative location, and in a legible non-smearable fashion. And it particularly aims to permit this to be done to a laminated type of tire flap that is more or less curved in cross section and of variable thickness from edge to edge.

With the illustrated embodiment of the invention in mind and without intention to unnecessarily limit its scope, the invention, concisely stated, consists in branding or searing the identifying characters onto the article. The apparatus consists of a branding plate which is adapted to be heated, and a work support that is shiftable towards the branding plate to hold the article against the heated characters thereof.

The invention is illustrated in the accompanying drawings in which;

Figs. 1 and 2 are bottom and top plan views, respectively, of the branding head, the latter being partly broken away to better illustrate the construction, Fig. 3 is a cross section on the line 3—3 Fig. 2, Figs. 4 and 5 are cross sections on the lines 4—4 and 5—5, respectively, of Fig. 2, Figs. 6 and 7 are a plan view and side elevation, respectively, of the work support, Figs. 8 and 9 are cross sections on the lines 8—8 and 9—9, respectively, of Fig. 6, Fig. 10 is a side elevation of the apparatus assembled, and Fig. 11 is a diagrammatic section of a typical tire flap.

The branding mechanism is illustrated in detail in Figs. 1 to 5. It consists of a holder 1 provided with a fan-tailed groove 2 for reception of any one of a number of branding plates 3, whose bottom faces are provided with identifying characters such as those shown in Fig. 1. Immediately above the holder 1 is located a sheet of insulating material 4, such as mica, and thereabove an electrical heating element 5 of some suitable metallic composition. The latter is preferably made in one piece and doubly folded as indicated at 6 so that the major portion of the metallic ribbon 5 may lie in two parallel strands which are suitably secured as indicated at 7 between the folded portions of terminal plates 8, to which latter a current of suitable intensity may be supplied in any convenient manner. Above the heating element 5 a relatively poor conducting substance 9, such as asbestos, is laid to throw the heat into the branding member 3 as well as to insulate it electrically. The holder 1 is bolted as indicated at 10 to a backing plate 11.

The tire flap is held on a work support, which is illustrated in detail in Figs. 6 to 9, inclusive. The work support comprises a channel block 12 which has upstanding side flanges 13 and a central rib 14 which is provided with groups of sockets 15 and 16 at each of its ends for the reception of supporting springs 17. The central projection 14 is slotted lengthwise (and through the sockets) as indicated at 18 to receive a plurality of bars or sections 19 whose bottom faces rest on the springs 17 and are thereby yieldably supported. These bars or sections 19 are preferably of a size and spacing relative to one another suitable to accommodate the step-down structure of the well-known laminated tire flap. Their number and width may, of course, be varied as desired, the construction illustrated having been found to operate satisfactorily.

To hold the marginal portions of the flaps down in a more or less flat condition, the outermost sections 19 have suitably secured to them the flattening devices 20 of the onside U-shaped sheet-metal construction illustrated, their upper surfaces terminating clear of the sections 19 to which they are respectively attached. These flattening devices are preferably, but not necessarily, substantially co-extensive with the bars or sections 19.

The flattening devices 20 are made large enough to receive the largest flap and are not adjustable as to width. To properly guide flaps of various widths, adjustable edge guiding devices 21 and 22 are located adjacent the opposite ends of the bars or sections 19, each of these edge guiding devices being made in two parts having their opposed bottom walls lapped as indicated at 23 and preferably also the similarly disposed parts of each are joined by vertical webs 24 which are flanged as indicated at 25 for stiffness. The flanges 25 are adapted to project through openings 26 provided in the channel block 12. The edge guiding devices 21 and 22, which are of substantially the same construction, are each provided with a right and left hand threaded screw 27 for permitting the approach or separation of their parts suitable to the size of flap being marked, these screws being readily operated by the accessible knurled heads 28 pinned to their protruding ends.

As shown in Fig. 10, the branding mechanism, which is indicated generally by the numeral 29, is loosely seated in a slotted head 30 fixed in any suitable manner as by the rod 31 and bracket arm 32 to a column 33. In a second bracket arm 34, which is secured to the column 33, is slidably mounted a rod 35 which has a head 36. On the last named head the work support, which is indicated generally by the numeral 37, is secured in any suitable manner. By the pin and slot connection indicated at 38, the rod 35 is articulated to a lever 39 pivoted at 40 to the column 33 and operable through the link 41 and treadle 42.

In operation a flap 43 of the varying thickness illustrated may be readily threaded through the edge guiding device 21, flattening device 20 and the second edge guiding device 22, and thus put in a position ready for a branding operation. The operator then by merely depressing the treadle 42 may elevate the flap and raise it against the branding characters on the plate 3, which if heated to a temperature of around 1100° F. will quickly sear the desired marking thereon.

By the yielding construction of the work support, i. e., by the independent movement of the sections 19 which is permitted by the springs 17, inequalities in the thickness of the flap in cross section are taken care of and a substantially uniform intensity of marking is obtained. Preferably the sections or bars 19 are made equal in number and spaced similar to the rows of characters on the marking plate 3.

From the foregoing it will be seen that I have provided an apparatus in which there is no possibility of smearing the identifying marking, by which successive flaps may be branded in about the same location, at least relative the edges of the flaps, and in which there will be no blemishing of the margins of the flap, the latter being held down flat, or substantiallly so, adjacent the area where the mark is made.

As it will be obvious that many changes may be made in the details of the construction, without departing from the principles of the invention, reference should be made to the accompanying claims for an understanding of its scope.

Having thus described my invention, what I claim and desire to protect by Letters Patent is:

1. In an apparatus for marking tire flaps, in combination, a branding mechanism including metallic characters and means for heating the metallic characters, and a work support, said work support and branding mechanism being shiftable to and from cooperative branding relation, and means for insuring similar location of a branding mark on successive flaps and a uniform intensity of branding on each flap despite inequalities in its thickness.

2. In an apparatus for marking tire flaps, in combination, a branding member, means for supporting and heating the branding member, a work support, means for relatively moving the work support and the branding member, and edge guiding and flattening devices.

3. In an apparatus for marking tire flaps, in combination, a branding member, means for supporting and heating the branding member, a work support, edge guiding devices at opposite ends of the branding member, edge flattening devices at opposite ends of the branding member, said edge guiding devices being adjustable to accommodate flaps of different widths, and means permitting relative movement of the branding member and work support.

Signed at Detroit, Michigan, this 25th day of May, 1921.

ADRIAN O. ABBOTT, Jr.